US009059917B2

(12) United States Patent
Muscariello et al.

(10) Patent No.: US 9,059,917 B2
(45) Date of Patent: Jun. 16, 2015

(54) TECHNIQUE FOR PROCESSING FLOWS IN A COMMUNICATIONS NETWORK

(75) Inventors: Luca Muscariello, Chatenay-Malabry (FR); Thomas Bonald, Voisins le Bretonneux (FR)

(73) Assignee: France Telecom, Paris (FR)

(*) Notice: Subject to any disclaimer, the term of this patent is extended or adjusted under 35 U.S.C. 154(b) by 588 days.

(21) Appl. No.: 13/318,288

(22) PCT Filed: Apr. 19, 2010

(86) PCT No.: PCT/FR2010/050744
§ 371 (c)(1),
(2), (4) Date: Dec. 20, 2011

(87) PCT Pub. No.: WO2010/128228
PCT Pub. Date: Nov. 11, 2010

(65) Prior Publication Data
US 2012/0093133 A1    Apr. 19, 2012

(30) Foreign Application Priority Data
May 4, 2009  (FR) .................................. 09 52951

(51) Int. Cl.
*H04L 12/28* (2006.01)
*H04L 12/801* (2013.01)
(Continued)

(52) U.S. Cl.
CPC ................ *H04L 47/10* (2013.01); *H04L 47/14* (2013.01); *H04L 47/2441* (2013.01); *H04L 47/28* (2013.01); *H04L 47/32* (2013.01); *H04L 47/56* (2013.01); *H04L 49/9078* (2013.01)

(58) Field of Classification Search
CPC ......... H04L 47/10; H04L 47/14; H04L 47/28; H04L 47/32; H04L 47/56; H04L 47/2441; H04L 49/9078
See application file for complete search history.

(56) References Cited

U.S. PATENT DOCUMENTS

| 2002/0036984 | A1* | 3/2002 | Chiussi et al. ................ 370/232 |
| 2005/0099979 | A1 | 5/2005 | Chandra |

(Continued)

FOREIGN PATENT DOCUMENTS

| EP | 1531588 A1 | 5/2005 |
| EP | 2031809 A1 | 3/2009 |

OTHER PUBLICATIONS

Seok et al., "Queue Management Algorithm for Multi-rate Wireless Local Area Networks," Sep. 7-10, 2003, IEEE.*

(Continued)

*Primary Examiner* — Jae Y Lee
(74) *Attorney, Agent, or Firm* — David D. Brush; Westman, Champlin & Koehler, P.A.

(57) ABSTRACT

A method is provided for processing flows in a wireless communications network. Data packets belonging to different flows are received by a device of a communications network and stored in a queue to enable them to be sent by the device over a radio channel to at least one node. Access to the radio channel is time-shared between a plurality of nodes. The method includes: at least one step of determining a duration associated with a flow, the duration corresponding to a virtual duration needed for sending packets of said flow stored in the queue; and in order to send a data packet, a step of selecting one of the flows amongst a plurality of flows, in which step a flow is selected for which the associated duration is the smallest, and a step of sending a packet of the selected flow as extracted from the queue.

8 Claims, 2 Drawing Sheets

(51) Int. Cl.
  *H04L 12/851* (2013.01)
  *H04L 12/841* (2013.01)
  *H04L 12/823* (2013.01)
  *H04L 12/875* (2013.01)
  *H04L 12/861* (2013.01)

(56) References Cited

U.S. PATENT DOCUMENTS

2009/0059787 A1* 3/2009 Bonald et al. .......... 370/230
2010/0027424 A1* 2/2010 Radunovic et al. ..... 370/238

OTHER PUBLICATIONS

English Translation of the Preliminary Report on Patentability and Written Opinion dated Nov. 29, 2011 for corresponding International Application No. PCT/FR2010/050744, filed Apr. 19, 2010.
International Search Report and Written Opinion dated Jul. 26, 2010 for corresponding International Application No. PCT/FR2010/050744, filed Apr. 19, 2010.
Yongho Seok et al., "Queue Management Algorithm for Multi-Rate Wireless Local Area Networks" Personal, Indoor and Mobile Radio Communications, 2003. PIMRC 2003. 14th IEEE Proceedings on Sep. 7-10, 2003, IEEE, Piscataway, NJ, USA, vol. 2, Sep. 7, 2003, pp. 2003-2008, XP010677911.

* cited by examiner

TECHNIQUE FOR PROCESSING FLOWS IN A COMMUNICATIONS NETWORK

CROSS-REFERENCE TO RELATED APPLICATIONS

This application is a Section 371 National Stage Application of International Application No. PCT/FR2010/050744, filed Apr. 19, 2010 and published as WO 2010/128228 on Nov. 11, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure is situated in the field of communication via a wireless communications network, in particular for a network in which access to the radio channel is time-shared between a plurality of nodes. More precisely, the disclosure relates to a technique of processing flows in such a communications network.

BACKGROUND OF THE DISCLOSURE

More and more services are being deployed over accesses to a packet communications network, e.g. the Internet, regardless of whether the services are fixed or mobile. By way of example, these services include voice calls, video file transfers, games, and web type services. By their nature, they have quality-of-service requirements that differ in terms of delay and packet loss rate.

The European patent application published under the number EP 2 031 809 proposes a method of processing flows that enables differentiated processing to be implemented on data flows at a point in a communications network. Data packets belonging to different flows are received by a device of the communications network and they are stored in a queue for onward sending by the device. In order to send a data packet, a flow is selected having the least memory space allocated thereto in the queue, and a packet of the selected flow is extracted from the queue and sent, and when the memory space available in the queue does not enable a received packet to be stored, a flow is selected to which the most memory space in the queue is allocated and a data packet of the selected flow is deleted from the queue. That differentiated processing of the packets does not require the packets belonging to the various flows to be explicitly marked. It enables differentiating service levels to be provided, seeking to send certain types of flow on a priority basis in implicit manner, i.e. without explicitly determining the associated applications.

Consideration is given below to a device in which one of the interfaces is of the wireless type, i.e. operates by radio, and for which access to the radio resource is time-shared between various users. Various users or pieces of equipment are connected via the wireless interface to the device. When the link between one of the pieces of equipment and the device is subjected to poor radio conditions, a low data rate is selected and consequently the time required for sending a packet will be longer. Because access to the radio resource is time-shared, that longer time retards the sends of all of the packets waiting in the device. Thus, as soon as one user is subjected to poor radio conditions, the other users are also penalized.

In operation, the device receives packets belonging to different flows for different users on one of its interfaces and it sends them to the destination users of those flows via the wireless interface. The above-described flow processing method does not enable good performance to be obtained under such circumstances. By way of example, for two users A and B, each having an ongoing flow of the same type, e.g. a video file transfer in "streaming" mode, the respective flows of those two users A and B will be differentiated by the flow processing method relative to any other non-real time flows of those users and processed on a priority basis. If user A is subjected to radio conditions that are poor compared with those of user B, then the flow of user B will be penalized by the flow of user A for the reasons set out above. The implicit differentiated processing between flows as proposed in document EP 2 031 809 therefore does not enable good performance to be obtained in terms of scheduling packets for sending over a radio interface having time-shared access.

SUMMARY

In a first aspect, an embodiment of the invention provides a flow processing method, with data packets belonging to different flows being received by a device of a communications network and stored in a queue for sending by said device over a radio channel to at least one node, access to the radio channel being time-shared between a plurality of nodes, the method comprising:
  at least one step of determining a duration associated with a flow, the duration corresponding to a virtual duration needed for sending packets of said flow stored in the queue; and
  in order to send a data packet, a step of selecting one of the flows amongst a plurality of flows, in which step a flow is selected for which the associated duration is the smallest, and a step of sending a packet of the selected flow as extracted from the queue.

Thus, by means of an embodiment of the invention, it is possible to benefit from the advantages of the flow processing method constituting the subject matter of patent application EP 2 031 809, while taking account of the particular features of a radio channel having time-shared access. Provision is made for such radio channels in particular in the IEEE 802.11 standard, in the worldwide interoperability for microwave access (WIMAX) standard, or in the universal mobile telecommunications system high speed downlink packet access (UMTS HSDPA) standard.

The flow processing method is implemented in equipment of the communications network that is suitable for routing data packets. For example, it may be an access point of the communications network, enabling pieces of equipment to access the communications network via a shared-access radio channel.

Thanks to the criterion used for differentiating flows, the method thus enables account to be taken of a virtual duration corresponding to the duration that would be needed for forwarding all of the packets of a flow stored in the queue in the absence of any other flow. By taking account of this duration associated with a flow, it is possible to differentiate the flows, and it is then possible to apply differentiated processing to the packet of the flows. When considering the flows of a first user, the real-time type flows of the first user, which by their very nature are more sensitive to delays and to packet losses, benefit from processing with priority over non-real-time type flows of the same first user. Consideration is now given to a second user making use of a data rate that is equivalent to that of the first user. When the flows of this second user are likewise processed by the device, an implicit differentiation is also obtained between the flows of the first and second users. Consideration is then given to a third user using a low data rate, in particular because of poor radio conditions. As for the first two users, an implicit differentiation is likewise obtained between the flows of the third user. In addition, thanks to the flow processing method, it is possible to provide differing processing for all of the flows, independently of the user of the flow, by taking account of the respective radio conditions encountered by the users.

In addition, like for the flow processing method described in patent application EP 2 031 809, there is no need for packets to be marked explicitly, in order to differentiate data flows relating to a service as a function of a required quality of service. An embodiment of the invention takes advantage of the following observations. Flows relating to a service of the real-time type are naturally regulated by the sender of the flow, in particular as a result of flow rate being limited by the sender. In contrast, flows relating to a non-real-time service, e.g. a data transfer service are not regulated on being sent.

It should be observed that such differentiated processing adapts to changes in the services and the structures of the flows. Thus, a flow may have portions of different kinds, these different portions corresponding to respective different services. For example, a single flow may include a telephone conversation, which requires real-time processing, followed by a transfer of files that are to be processed in deferred time by the receiver.

The flow processing method thus makes it possible to take account both of the nature of the flow and of radio conditions while processing flows for a set of users sharing access to the radio resource.

According to particular characteristics, when the queue does not enable a received packet to be stored, the method further comprises:
 a step of selecting a flow, in which step a flow is selected for which the associated duration is the greatest; and
 a step of deleting at least one data packet of the selected flow from the queue.

When the queue is saturated and does not enable a received packet to be stored, the method thus determines the flow amongst the flows having packets waiting in the queue for which the virtual duration needed for sending the waiting packets is the greatest compared with the others. The differentiated processing enable memory space to be freed in the queue by deleting a packet from a flow for which sending all of the packets stored in the queue would require the radio resource to be occupied for the longest length of time, so as to make memory space available that is needed for packets that are newly received by the device. For example, data transfer flows are generally more tolerant of delays and of packet losses, in particular because of protection that is implemented in layers of level higher than the level 2 and 3 layers of the open systems interconnection (OSI) reference model.

According to other particular characteristics, the method further comprises a step of obtaining an indicator that is representative of radio conditions of a link between the access point and a node, the duration associated with a flow being determined as a function of said indicator concerning the link between the access point and the destination node of the flow.

Thus, when radio conditions vary, in particular as a result of improvements or degradations of the radio interface, the durations associated with the flows are re-evaluated as a function of the new radio conditions. The differentiated processing of the flows is thus not "frozen" and adapts in this way to new radio conditions.

The indicator representative of radio conditions may in particular belong to the group comprising at least a data rate and a radio quality indicator.

Furthermore, in a particular embodiment, the steps of the method are carried out while processing data packets in a layer of level 2 or level 3 of the OSI reference model.

The processing of the flows may be performed in various layers of the OSI reference model, and more precisely in the layers of levels 2 and 3. These are the medium access control (MAC) layer, the link logical control (LLC) layer, or the Internet protocol (IP) layer.

In a second aspect, an embodiment of the invention also provides a device for processing flows in a communications network, data packets belonging to different flows being received and stored in a queue for sending by said device over a radio channel, the access to the radio channel being time-shared between a plurality of nodes, the device comprising:
 determination means for determining a duration associated with a flow, the duration corresponding to a virtual duration needed for sending packets of said flow that are stored in the queue;
 selector means for selecting one of the flows amongst a plurality of flows for the purpose of sending a data packet of said flow, the selector means being arranged to select a flow for which the associated duration is the smallest; and
 sender means for sending a packet of the selected flow over the radio channel, as extracted from the queue.

In a third aspect, an embodiment of the invention also provides an access point to a communications network, the access point including a device for processing flows as described above.

In a fourth aspect, an embodiment of the invention provides a program for a device for processing flows, the program including program code instructions for controlling the execution of the steps of the above-described method when said program is executed by said device, and also a recording medium readable by a device for processing flows and having recorded thereon a program for the device for processing flows.

BRIEF DESCRIPTION OF THE DRAWINGS

The disclosure can be better understood with the help of the following description of a particular implementation of the method of the invention, given with reference to the accompanying drawings, in which.

DETAILED DESCRIPTION OF ILLUSTRATIVE EMBODIMENTS

Figure 1:
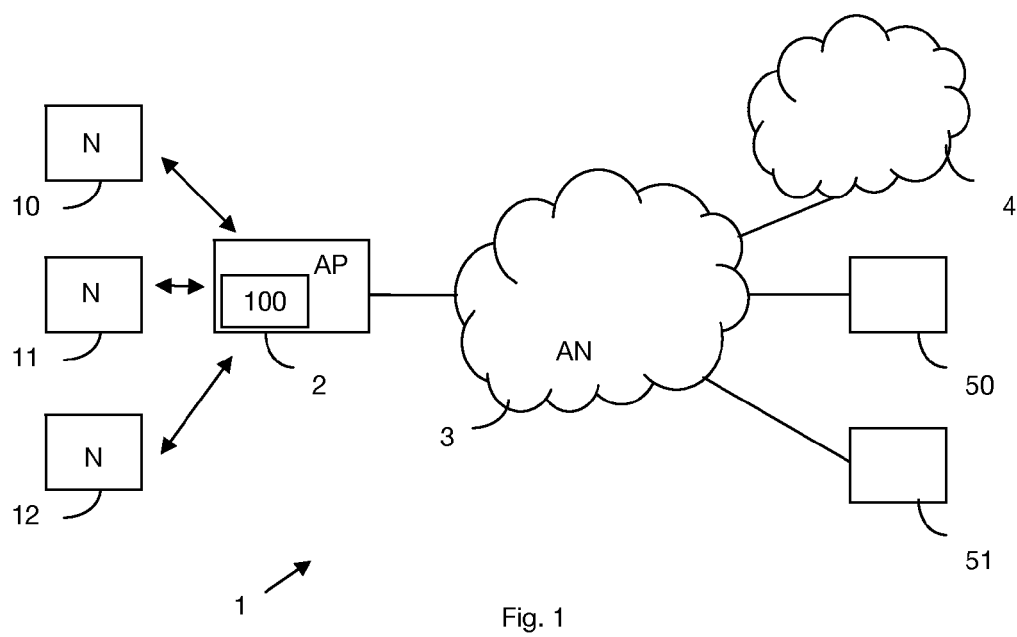
FIG. 1 shows a communications system.

FIG. 1 shows a communications system 1 enabling users 10, 11, 12 to access various services such as telephony, television, video on demand, the Internet. Each user or node 10, 11, 12 is connected to the system via an access point 2 of the communications system 1. More precisely, the access point 2 is a wireless access point and the users 10, 11, 12 communicate with the access point 2 by means of a time-shared access radio resource or channel. It may be a radio resource for which accesses take place in compliance with the IEE 802.11 standard. The access point 2 is itself connected to an access network 3. This network enables users to access the Internet 4 or various other services via service gateways or servers 50, 51.

When a user 10, 11, 12 accesses a particular service, data packets relating to that particular service are exchanged between the access point 2 and equipment of the Internet 4 or a service gateway 50, 51.

Below, the term "flow" designates the set of a user's data packets that are associated with a given application instance, for example a telephone conversation, transmitting a video stream, downloading a file, etc. As a non-limiting example, a flow may be identified in an IP type network by the quintuplet: source address; destination address; source port number; destination port number; and protocol (transmission control protocol (TCP) or user datagram protocol (UDP)). With the IPv6 protocol, the flow may merely be identified by the "flow ID" field that is provided for this purpose. It should be observed that flow identification takes place merely by reading the fields of the protocol headers. Furthermore, a single flow may comprise different portions, these different portions not having the same quality-of-service requirements. For example, in a single flow, there may be a telephone conversation, requiring real time processing, followed by a transfer of files that are intended for processing in deferred time by the receiver. A flow may also comprise browsing a web site that has an interactive portion for consulting pages, which by its very nature is sensitive to delay and to packet loss rate, followed by a file transfer portion, which by its nature is better at tolerating delay and loss of packets.

Here consideration is given to the particular circumstance of flows belonging to a plurality of users using the radio resource via time-shared access.

The access point 2 receives the data packets, stores them in a queue, and sends them as a function of routing criteria.

By way of example, consideration is now given to routing data packets in an IP type network. Equipment that contributes to routing data implements various layers of the OSI reference model, and more particularly the layers of levels 2 and 3. These are the MAC layer and the LLC or IP layer. These various layers generally implement queues for data exchanges between one another. Consideration is given here to a particular layer. The data packets received by said layer from a higher layer are stored in a queue and they are sent to the lower layer for processing.

By way of example, consideration is given to a particular implementation in which the method is implemented at the level of the LLC layer, and in particular in the management of the queue of data packets from the higher IP layer to the lower MAC layer.

The queue also includes a duration associated with each flow, which duration is representative of a virtual duration needed for sending the packets stored in the queue for that flow. This virtual duration depends on the data rate selected for the user to whom the flow is to be sent. It corresponds to packets being sent without constraint, i.e. in the absence of any other flow.

In general, the flow-processing method of an embodiment of the invention serves to schedule the flows that are transmitted by the access point 2 to various users sharing the radio resource. The real time type flows from the users that present the best rates are processed with priority over the other flows. The non-real time type flows of the users that present the poorest rates are processed in non-priority manner.

Figure 2:
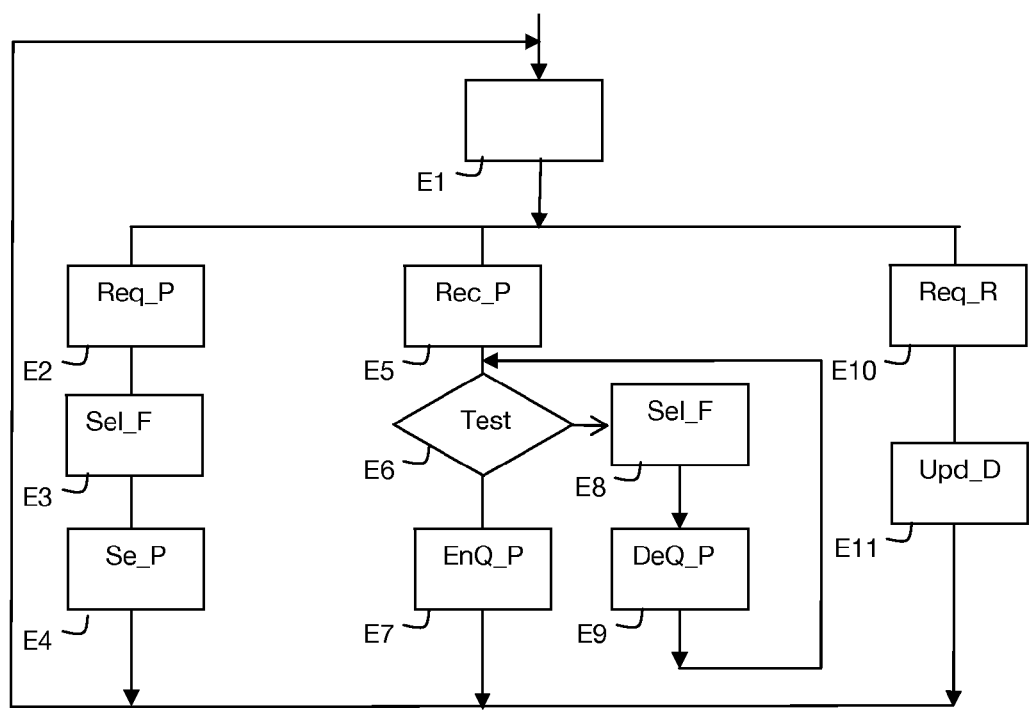
FIG. 2 shows the steps of the method in a particular embodiment of the invention.

There follows a description of the flow processing method in the particular implementation shown in FIG. 2.

In a waiting first step E1, the method waits for an event.

During a step E5 a data packet for sending is received from the IP layer. The data packet is received from the access network 3 and is for sending to one of the nodes or users 10, 11, 12.

In a step E6 of testing available memory space, it is verified whether the packet can be stored in the queue, i.e. whether the memory space available in the queue is greater than the size of the received packet.

If the free memory space in the queue is sufficient compared with the size of the received packet, then in a step E7, it is determined which flow the data packet belongs to from the header of the data packet, e.g. from the quintuplet {source address; destination address; source port number; destination port number; and protocol}, and the packet is stored in the queue. The duration associated with the flow is also updated to take account of the virtual sending duration of the packet. By way of example, it may be appropriate to determine once more the virtual duration associated with the flow as a function of a data rate that is stored for the user of the flow. The method then returns to step E1 waiting for an event.

If at the end of step E6, it is found that the free memory space in the queue is not sufficient compared with the size of the received packet, then in a first flow-selection step E8, one of the flows amongst the flows having packets stored in the queue is selected as a function of the respective durations associated with the flows. More precisely, the flow that is selected from the various flows is the flow having the associated duration that is the greatest, i.e. a flow for which the virtual duration needed for sending all of the packets stored in the queue is the greatest.

In a first processing step E9, a packet of the selected flow is extracted and deleted from the queue. The duration associated with the flow is updated in order to delete therefrom the duration for sending the deleted packet.

A flow for which the associated duration is large compared with the other flows that have waiting packets is a non-priority flow. The differentiated processing enables memory space to be released in order to make available the memory space needed for the packet newly received by the device in step E5. Data transfer flows in particular are more tolerant to delays and to loss of packets, in particular because of protection that is implemented in layers at levels higher than the layers at levels 2 and 3 in the OSI reference model. Since they are generally not regulated on transmission, it is possible for there to be a large number of packets waiting in the queue. Thus, at least one data packet of a non-priority flow is deleted from the queue, while taking radio conditions into account, and without any need for the packet to be previously marked as a function of a class of service. In a common mode of operation for managing queues, in the event of such saturation, the received packet is not processed. However, the non-processed packet might well form part of a high-priority flow.

The method then passes on to step E6 of testing the available memory space. When packets may be of various lengths, the memory space that is made available by deleting a packet need not necessarily enable the received packet to be accepted.

During a step E2, a request is detected that comes from the MAC layer and that seeks to obtain a data packet for forwarding.

In a second flow-selection step E3, one of the flows amongst the flows having packets stored in the queue is selected as a function of the respective durations associated with the flows. More precisely, a flow is selected for which the associated duration is the smallest, i.e. a flow for which the time required for sending all of the packets is the shortest.

In a second processing step E4, a packet is extracted that belongs to the selected flow in the queue and it is sent to the MAC layer for sending to its destination. The duration associated with the flow corresponding to the extracted packet is updated, in order to delete therefrom the virtual duration needed for sending the selected packet.

A flow for which the associated duration is the smallest compared with the other flows that have waiting packets is a priority flow. The differentiated processing taking account of the virtual duration associated with the flow enables flows to be sent on a priority basis, and in particular flows of the real time type, which by their very nature are more sensitive to delays and to packet losses, in contrast to non-real time flows. They thus benefit from priority processing while the packets in the queue are being processed. Thus, at least one data packet of a priority flow is sent with priority as a function of radio conditions, without it being necessary to have previously marked the packets as a function of a class of service. In a common mode of operation for managing queues, under such circumstances, and by way of example, a packet is sent from amongst the oldest packets stored in the queue. Under such circumstances, the packet that is sent may belong to a non-priority flow, even though packets belonging to priority flows might well remain in the queue.

The method then returns to step E1 waiting for an event.

During a step E10 of obtaining an indicator representative of radio conditions, an indicator representative of radio conditions for the link between the access point 2 and one of the users 10, 11, 12 is obtained from the MAC layer. By way of example, the indicator may be the data rate associated with the user. This data rate is representative of a data rate at a given instant selected for data exchanges taking place between said user 10, 11, 12 and the access point 2. The user of a flow is determined from the header of the flow, e.g. from the destination IP address included in the header.

In a step E11 of determining durations associated with the flows, when the data rate has changed, the method determines for each flow of that user and as a function of the data rate that is obtained, a duration associated with the flow that corresponds to the virtual duration that would be necessary for the access point 2 to send all of the packets stored in the queue for said flow. More precisely, the access point 2 determines for each of the flows of this user a duration equal to dividing the memory space occupied by the packets of the flow in the queue by the data rate obtained for the user of the flow. Thus, during the steps E3 and E9 of selecting a flow for sending and for deleting, the observed conditions at the radio interface are taken into account.

The description of the method is given above for a particular implementation in the LLC layer. The method may also be implemented in the IP layer, or in the MAC layer.

In the method as described above, in order to determine the duration that is associated with the flow, the indicator representative of radio conditions that is used is the data rate selected by the radio interface. This duration could be determined by any other means, in particular by taking account of indicators concerning radio quality. The idea is to use a function that enables a duration to be obtained that is associated with the flow on the basis of the memory space allocated to the packets of the flow and on the basis of a radio quality indicator associated with the user, which duration is representative of a virtual duration for sending packets of the flow stored in the queue.

Figure 3:
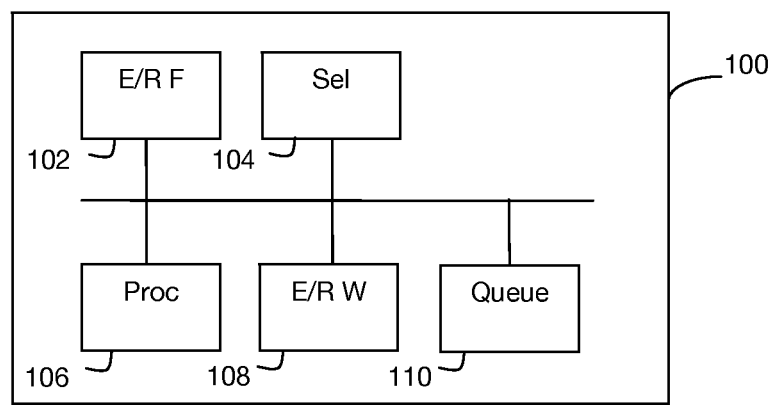
FIG. 3 shows a device for processing flows in a particular embodiment of the invention.

There follows a description of a device for processing flows in a particular embodiment of the invention, given with reference to FIG. 3.

The device 100 for processing flows in a communications network comprises:

a memory zone 110 arranged to store, in the form of a queue, both data packets of flows and durations associated with the various flows having data packets stored in the memory zone 110;

a receiver module 102 for receiving flows of data packets from the access network 3 and for storing them in the queue, to enable them to be sent subsequently;

a selector module 104 for selecting a flow, arranged to select one of the flows amongst the flows having packets stored in the queue as a function of a predetermined criterion that depends on the duration associated with the flow selected from the queue;

a control module 106; and a module 108 for transmitting and receiving over a radio channel with time-shared access.

The module 104 is arranged to select one of the flows from among the flows having data packets stored in the memory zone 110. More precisely, the module 104 is arranged to select a flow for which the associated duration is the smallest or to select a flow for which the associated duration is the largest.

The control module 106 is arranged to determine a duration associated with a flow, to control the flow selector module 104 and to process at least one data packet of the selected flow as extracted from the queue. More precisely, the control module 106 is arranged to delete a data packet from the queue as a function of the flow selected by the selector module 104 and, where appropriate, to send the packet to the module 108 for transmission over the radio channel.

The control module 106 is also arranged to obtain a data rate associated with a user from the transceiver module 108, which data rate is used to update the durations associated with the flows of that user.

The modules 102, 104, 106, and 108 are arranged to implement the above-described method. They are preferably software modules comprising software instructions for causing the steps of the above-described method to be executed when implemented by the device for processing flows. An embodiment of the invention thus also provides:

a program for a device for processing flows, the program including program code instructions for controlling the execution of the steps of the above-described method when said program is executed by said device; and a recording medium readable by the device for processing flows and having recorded thereon the program for a device for processing flows.

The software modules may be stored in or conveyed by a data medium. The medium may be a hardware storage medium, e.g. a compact disk read-only memory (CD-ROM), a magnetic floppy disk, or a hard disk, or it may be a transmission medium such as an electrical, optical, or radio signal, or a telecommunications network.

The device for processing flows 100 may be incorporated in an access point 2 of the communications network.

An embodiment of the invention is equally applicable to various types of time-shared access radio resource, such as WIMAX or UMTS HSDPA.

Although the present disclosure has been described with reference to one or more examples, workers skilled in the art will recognize that changes may be made in form and detail without departing from the scope of the disclosure and/or the appended claims.

The invention claimed is:

1. A flow processing method, with data packets belonging to different flows being received by a device of a communications network and stored in a queue for sending by said device over a radio channel to at least one node, access to the radio channel being time-shared between a plurality of nodes, the method comprising:
   determining a duration for a flow, the duration being equal to a virtual duration needed for sending all of the packets of said flow stored in the queue; and
   in order to send a data packet, selecting one of the flows amongst a plurality of flows by the device, wherein the flow is selected for which the determined duration is the smallest, and sending a packet of the selected flow as extracted from the queue.

2. The method according to claim 1, wherein, when the queue does not enable a received packet to be stored, the method comprises:
   selecting a flow, wherein the flow is selected for which the determined duration is the greatest; and
   deleting at least one data packet of the selected flow for which the determined duration is the greatest from the queue.

3. The method according to claim 1, further comprising obtaining an indicator that is representative of radio conditions of a link between the access point and a destination node, the duration associated with a flow being determined as a function of said indicator concerning the link between the access point and the destination node of the flow.

4. The method according to claim 3, wherein the indicator representative of radio conditions belongs to the group comprising at least a data rate and a radio quality indicator.

5. The method according to claim 1, wherein the method is carried out while processing the data packets in a layer of level 2 or level 3 of the Open Systems Interconnection (OSI) reference model.

6. A device for processing flows in a communications network and for sending by said device over a radio channel, wherein access to the radio channel is time-shared between a plurality of nodes, the device comprising:
   a queue configured to store data packets belonging to different flows received by the device from the communications network;
   determination means for determining a duration for a flow, the duration being equal to a virtual duration needed for sending all of the packets of said flow that are stored in the queue;
   selector means for selecting one of the flows amongst a plurality of flows for the purpose of sending a data packet of said flow, the selector means being arranged to select a flow for which the determined duration is the smallest; and
   sender means for sending a packet of the selected flow over the radio channel, as extracted from the queue.

7. An access point of a communications network, the access point including a device for processing flows according to claim 6.

8. A hardware recording medium readable by a device and comprising a program recorded thereon, the program including program code instructions for controlling execution of a method of processing flows, when said program is executed by said device, wherein data packets belonging to different flows are received by a device of a communications network and stored in a queue for sending by said device over a radio channel to at least one node, access to the radio channel being time-shared between a plurality of nodes, wherein the method comprises:
   determining a duration for a flow, the duration being equal to a virtual duration needed for sending all of the packets of said flow stored in the queue; and
   in order to send a data packet, selecting one of the flows amongst a plurality of flows, wherein the flow is selected for which the determined duration is the smallest, and sending a packet of the selected flow as extracted from the queue.

\* \* \* \* \*